United States Patent
Zeng et al.

(10) Patent No.: US 9,125,084 B2
(45) Date of Patent: Sep. 1, 2015

(54) SYSTEMS AND METHODS FOR PERFORMING LAYER ONE LINK AGGREGATION OVER WIRELESS LINKS

(71) Applicant: Aviat U.S., Inc., Santa Clara, CA (US)

(72) Inventors: Chaoming Zeng, Milpitas, CA (US); Sergio Licardie, Cupertino, CA (US)

(73) Assignee: Aviat U.S., Inc., Santa Clara, CA (US)

( * ) Notice: Subject to any disclaimer, the term of this patent is extended or adjusted under 35 U.S.C. 154(b) by 117 days.

(21) Appl. No.: 13/956,278

(22) Filed: Jul. 31, 2013

(65) Prior Publication Data

US 2014/0269263 A1 Sep. 18, 2014

Related U.S. Application Data

(60) Provisional application No. 61/785,929, filed on Mar. 14, 2013.

(51) Int. Cl.
*H04W 24/04* (2009.01)
(52) U.S. Cl.
CPC ..................................... *H04W 24/04* (2013.01)
(58) Field of Classification Search
CPC ............. H04W 24/04; H04W 28/0231; H04L 12/40182
See application file for complete search history.

(56) References Cited

U.S. PATENT DOCUMENTS

| | | | |
|---|---|---|---|
| 6,910,149 B2 * | 6/2005 | Perloff et al. .................. | 714/4.3 |
| 8,264,953 B2 | 9/2012 | Licardie et al. | |
| 2003/0012218 A1 | 1/2003 | Russell et al. | |
| 2003/0072323 A1 | 4/2003 | Frecassetti et al. | |
| 2003/0161270 A1 | 8/2003 | Valvo et al. | |
| 2003/0165153 A1 | 9/2003 | Maggio et al. | |
| 2003/0169748 A1 * | 9/2003 | Weyman et al. .............. | 370/401 |
| 2005/0068993 A1 | 3/2005 | Russell et al. | |
| 2006/0271702 A1 | 11/2006 | Canali et al. | |
| 2007/0065078 A1 | 3/2007 | Jiang | |
| 2007/0165646 A1 | 7/2007 | He | |
| 2007/0280251 A1 | 12/2007 | Wang et al. | |

(Continued)

OTHER PUBLICATIONS

International Application No. PCT/US2014/028527, International Search Report and Written Opinion mailed Aug. 15, 2014.

*Primary Examiner* — Abert T Chou
(74) *Attorney, Agent, or Firm* — Sheppard, Mullin, Richter & Hampton LLP

(57) ABSTRACT

A first layer one link aggregation master comprises a first port coupled to receive customer traffic; a first channel; a second channel; an aggregation engine coupled to the first and second channels; a first switch circuit coupled to the first port and to the first channel, and configured to communicate the customer traffic from the first port over the first channel to the aggregation engine, the aggregation engine including a splitter circuit configured to use layer one information to segment at least a portion of the customer traffic into a first virtual container and a second virtual container, the aggregation engine further including an encapsulation circuit configured to encapsulate the second virtual container using Ethernet standards for transport over the second channel; a radio access card configured to generate an air frame based on the first virtual container for wireless transmission over a first wireless link of a link aggregation group to the receiver; and a second switch circuit coupled to the second channel, and configured to communicate the Ethernet-encapsulated second virtual container over an Ethernet cable to a slave for wireless transmission over a second wireless link of the link aggregation group to the receiver.

15 Claims, 9 Drawing Sheets

(56) References Cited

U.S. PATENT DOCUMENTS

| | | |
|---|---|---|
| 2008/0089235 A1 | 4/2008 | Kotrla et al. |
| 2008/0138084 A1 | 6/2008 | Youn et al. |
| 2008/0317465 A1 | 12/2008 | Yu |
| 2009/0003206 A1 | 1/2009 | Bitar |
| 2009/0067324 A1* | 3/2009 | Licardie et al. ............... 370/225 |
| 2009/0141731 A1 | 6/2009 | Bitar |
| 2012/0044800 A1 | 2/2012 | Coltro |
| 2012/0275297 A1 | 11/2012 | Subramanian |

* cited by examiner

SYSTEMS AND METHODS FOR PERFORMING LAYER ONE LINK AGGREGATION OVER WIRELESS LINKS

PRIORITY CLAIM

This application claims benefit of and hereby incorporates by reference provisional patent application Ser. No. 61/785,929, entitled "Layer 1 Link Aggregation over Ethernet," filed on Mar. 14, 2013, by inventors Sergio Licardie and Chaoming Zeng.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to wireless communication, and more particularly provides systems and methods for performing layer one link aggregation over wireless links.

BACKGROUND

The requirements of extended capacity and increased reliability in data communication environments has created a need for carrier-class (or carrier grade) availability. Enterprises such as mobile wireless carriers, data access providers, and fixed wireless carriers, as well as enterprises and government institutions that operate broadband wireless networks often use carrier-class infrastructure for handling their IP communications and mission critical applications. For example, to carry voice and real-time traffic in converged environments, a carrier-class infrastructure may be configured to deliver the same level of availability as the public switched telephone network.

For increased bandwidth, load balancing and availability of communication channels between nodes (e.g., switches and stations), networks often use link aggregation techniques to combine multiple physical links into a single logical link (sometimes referred to as a "link aggregation group" or "LAG"). Link aggregation techniques are designed to achieve increased bandwidth and provide redundancy to support individual physical link failures.

IEEE 802.1AX describes the most common link aggregation technique. IEEE 802.1AX was designed to increase data rates across a link aggregation group in fixed unit multiples (trunked Fast Ethernet and Gigabit Ethernet). A hashing algorithm, which may be proprietary and vary among vendors, controls distribution of traffic among the physical links of the link aggregation group. When one link fails, the hashing algorithm redistributes the traffic across the remaining physical links. When a failed link recovers, the hashing algorithm redistributes the traffic to include the recovered link.

FIG. 1 illustrates an example network 100 of four parallel gigabit Ethernet links 104a-104d (each generally referred to as a link 104) combined to create a logical link 106 supporting four gigabits per second. As shown, the network 100 includes a switch/router A coupled via the logical link 106 to a switch/router B. Switch/router A includes an aggregation engine 108, which is capable of using link aggregation to transmit and receive traffic across the physical links 104 of the logical link 106. Switch/router B includes an aggregation engine 110, which is also capable of using link aggregation to transmit and receive traffic across the physical links 104 of the logical link 106.

Traditional hashing algorithms may use information from the packet headers at different network layers to distribute traffic. At layer 2, the traditional hashing algorithms determine which outgoing port to use by hashing destination and source MAC addresses. At layer 3, traditional hashing algorithms determine which outgoing port to use by hashing fields of the IP header, most commonly the source and destination IP address. Because these methods depend on the traffic flow characteristic and patterns of the payload, traditional hashing algorithms using layer 2 or layer 3 have proven less than effective. For example, in point-to-point systems, which have only one source and one destination MAC address, traditional hashing algorithms will not have MAC address diversity to distribute the traffic over multiple physical links, because the hashing of the source and destination MAC addresses will always result in the same outgoing port. Therefore, the traditional hashing algorithms will funnel all traffic over only one physical link 104. A layer 3 hashing algorithm will produce better results, due to a larger diversity of IP addresses in the payload. However, the layer 3 hashing algorithm will not achieve effective load balancing.

Further, in wireless (e.g., microwave) communication, IEEE 802.1AX does not effectively support link aggregation. IEEE 802.1AX demands that each link provide identical capacity. IEEE 802.1AX fails to accommodate the inherently inconsistent radio link capacities of wireless links. Further, IEEE 802.1AX demands that each physical link provide unchanging capacity. IEEE 802.1AX fails to accommodate the inherently dynamic radio bandwidth changes of wireless links. Accordingly, IEEE 802.1AX does not efficiently support wireless link aggregation.

Aviat Networks solved some of these problems with a layer one link aggregation (L1LA) technique, as described in U.S. Pat. No. 8,264,953, which is hereby incorporated by reference. As described, wireless links may be aggregated. Using layer one link aggregation, Aviat Networks developed a technique of layer one rapid channel failure detection and recovery and improved capacity over wireless links.

SUMMARY

In some embodiments, a first layer one link aggregation master is configured to control transmission of customer traffic to a receiver. The first layer one link aggregation master comprises a first port coupled to receive customer traffic; a first channel; a second channel; an aggregation engine coupled to the first and second channels; a first switch circuit coupled to the first port and to the first channel, and configured to communicate the customer traffic from the first port over the first channel to the aggregation engine, the aggregation engine including a splitter circuit configured to use layer one information to segment at least a portion of the customer traffic into a first virtual container and a second virtual container, the aggregation engine further including an encapsulation circuit configured to encapsulate the second virtual container using Ethernet standards for transport over the second channel; a radio access card configured to generate an air frame based on the first virtual container for wireless transmission over a first wireless link of a link aggregation group to the receiver; and a second switch circuit coupled to the second channel, and configured to communicate the Ethernet-encapsulated second virtual container over an Ethernet cable to a slave for wireless transmission over a second wireless link of the link aggregation group to the receiver.

The splitter circuit may segment the at least a portion of the customer traffic into the first virtual container to have a first size based on the capacity of the first wireless link and the second virtual container to have a second size based on the capacity of the second wireless link. The receiver may be a second layer one link aggregation master. The aggregation engine may include an FPGA. The first and second switch circuits may include layer two switch circuits.

In some embodiments, a method comprises receiving customer traffic; communicating the customer traffic over a first channel to an aggregation engine; using, by the aggregation engine, layer one information to segment at least a portion of the customer traffic into a first virtual container and a second virtual container; generating an air frame based on the first virtual container for wireless transmission over a first wireless link of a link aggregation group to a receiver; encapsulating the second virtual container using Ethernet standards for transport over the second channel; and communicating the Ethernet-encapsulated second virtual container over an Ethernet cable to a slave for wireless transmission over a second wireless link of the link aggregation group to the receiver.

In some embodiments, a first layer one link aggregation master is configured to control transmission of customer traffic to a customer device. The master comprises a radio access card configured to receive an air frame based on a first virtual container from a first wireless link of a link aggregation group; an internal interface switch circuit configured to receive an Ethernet-encapsulated second virtual container from a slave, the slave having received a second air frame based on the second virtual container from a second wireless link of the link aggregation group; a first channel; a second channel coupled to the internal interface switching circuit; an aggregation engine coupled to the first channel and to the second channel, configured to receive the first virtual container from the radio access card and the Ethernet-encapsulated second virtual container from the internal interface switch circuit via the second channel, configured to decapsulate the Ethernet-encapsulated second virtual container to generate the second virtual container, and including an assembly circuit configured to assemble the first virtual container and the second virtual container to generate customer data; and a customer-facing switch circuit coupled to the first channel, and configured to receive the customer data from the aggregation engine via the first channel and to transmit the customer data over a first port to a customer device.

The virtual container may have a first size based on the capacity of the first wireless link and the second virtual container may have a second size based on the capacity of the second wireless link. The aggregation engine may include an FPGA. The first and second switch circuits may include layer two switch circuits.

In some embodiments, a method comprises receiving an air frame based on a first virtual container from a first wireless link of a link aggregation group; receiving an Ethernet-encapsulated second virtual container from a slave, the slave having received a second air frame based on the second virtual container from a second wireless link of the link aggregation group; decapsulating the Ethernet-encapsulated second virtual container to generate the second virtual container; assembling the first virtual container and the second virtual container to generate customer data; and transmitting the customer data to a customer device.

In some embodiments, a layer one link aggregation terminal is configured to transmit customer traffic to a receiving terminal. The layer one link aggregation terminal comprises a first antenna assembly configured to assist in establishing a first wireless link of a link aggregation group with the receiving terminal; a second antenna assembly configured to assist in establishing a second wireless link of the link aggregation group with the receiving terminal; and an Ethernet cable. The terminal further comprises a first layer one link aggregation master including a first port coupled to receive customer traffic; a first channel; a second channel; an aggregation engine coupled to the first and second channels; a first switch circuit coupled to the first port and to the first channel, and configured to communicate the customer traffic from the first port over the first channel to the aggregation engine, the aggregation engine including a splitter circuit configured to use layer one information to segment at least a portion of the customer traffic into a first virtual container and a second virtual container, the aggregation engine further including an encapsulation circuit configured to encapsulate the second virtual container using Ethernet standards for transport over the second channel; a first radio access card configured to generate a first air frame based on the first virtual container for wireless transmission by the first antenna assembly over the first wireless link to the second terminal; and a second switch circuit coupled to the second channel and to the Ethernet cable, and configured to communicate the Ethernet-encapsulated second virtual container to the Ethernet cable. The terminal further comprises a first slave coupled to the Ethernet cable, and configured to receive the Ethernet-encapsulated second virtual container from the Ethernet cable. The slave includes a decapsulation circuit for decapsulating the Ethernet-encapsulated second virtual container; and a second radio access card coupled to the decapsulation circuit and to the second antenna assembly and configured to generate a second air frame based on the second virtual container for wireless transmission by the second antenna assembly over the second wireless link to the receiving terminal.

In some embodiments, a layer one link aggregation terminal is configured to transmit customer traffic to a customer device. The layer one link aggregation terminal comprises a master antenna assembly configured to assist in establishing a master wireless link of a link aggregation group with a transmitting terminal; a slave antenna assembly configured to assist in establishing a slave wireless link of the link aggregation group with the transmitting terminal and an Ethernet cable. The terminal further comprises a first slave, including a slave radio access card coupled to the slave antenna assembly and configured to receive a slave air frame based on a slave virtual container over the slave wireless link; an encapsulation circuit for encapsulating the slave virtual container to generate an Ethernet-encapsulated slave virtual container; and a slave switching circuit coupled to the Ethernet cable and configured to transmit the Ethernet-encapsulated slave virtual container to the Ethernet cable. The terminal further comprises a layer one link aggregation master including a master radio access card configured to receive a master air frame based on a master virtual container from the master wireless link; an internal interface switch circuit configured to receive the Ethernet-encapsulated slave virtual container from the slave; a first channel; a second channel coupled to the internal interface switching circuit; an aggregation engine coupled to the first channel and to the second channel, and configured to receive the first virtual container from the master radio access card and the Ethernet-encapsulated second virtual container from the internal interface switch circuit via the second channel, configured to decapsulate the Ethernet-encapsulated second virtual container to generate the second virtual container, and including an assembly circuit configured to assemble the first virtual container and the second virtual container to generate customer data; and a customer-facing switch circuit coupled to the first channel, and configured to receive the customer data from the aggregation engine via the first channel and to transmit the customer data over a first port to a customer device.

In some embodiments, a slave device comprises a radio access card configured to receive an air frame from a wireless link of a link aggregation group and tonerate one or more virtual containers; an Ethernet encapsulating circuit configured to encapsulate the one or more virtual containers to generate one or more Ethernet-encapsulated virtual containers; and a switching circuit configured to transport the one or more Ethernet-encapsulated virtual containers over an Ethernet cable to a layer one link aggregation master device.

In some embodiments, a slave device comprises a switching circuit configured to receive an Ethernet-encapsulated virtual container over an Ethernet cable from a layer one link aggregation master device; an Ethernet decapsulating circuit configured to decapsulate the Ethernet-encapsulated virtual container; and a radio access card configured to generate an air frame for transmission on a wireless link of a link aggregation group.

DETAILED DESCRIPTION

The following description is provided to enable a person skilled in the art to make and use various embodiments of the invention. Modifications are possible. The generic principles defined herein may be applied to the disclosed and other embodiments without departing from the spirit and scope of the invention. Thus, the claims are not intended to be limited to the embodiments disclosed, but are to be accorded the widest scope consistent with the principles, features and teachings herein.

In some embodiments, a network system uses layer one link aggregation (L1LA) to communicate data across multiple wireless links within an IEEE 802.1AX communication channel.

In some embodiments, a network system uses layer one link aggregation over Ethernet (L1LAoE) to communicate data across multiple wireless links. L1LAoE allows the user to combine multiple wireless links (carriers) into a single high capacity Ethernet transport channel without depending on traffic characteristics, e.g., MAC addresses, IP addresses or logical TCP/UDP port numbers. In some embodiments, the wireless links can be interconnected via Ethernet ports and Ethernet cables, rendering a system capable of achieving ubiquitous Gigabit+ capacity trunks with redundancy protection (e.g., by dynamically managing failure and restoration of individual wireless links as described in U.S. Pat. No. 8,264,953 of Aviat Networks, Inc.). L1LAoE may perform automatic capacity adjustments to compensate for the adaptive conditions present in wireless links, e.g., when using adaptive modulation. In some embodiments, L1LAoE can be incorporated within an IEEE 802.1AX communication channel. In some embodiments, L1LAoE is capable of increasing capacity and availability for a wireless backhaul.

Figure 1:
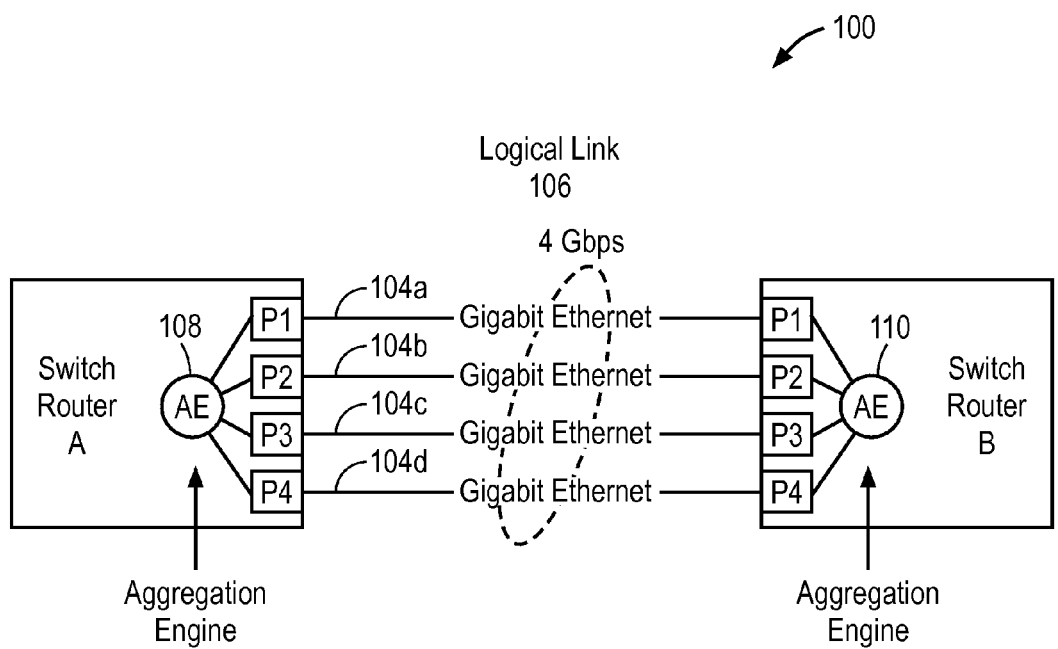
FIG. 1 is a block diagram illustrating details of a link aggregation network system in accordance with the prior art.
Figure 2:
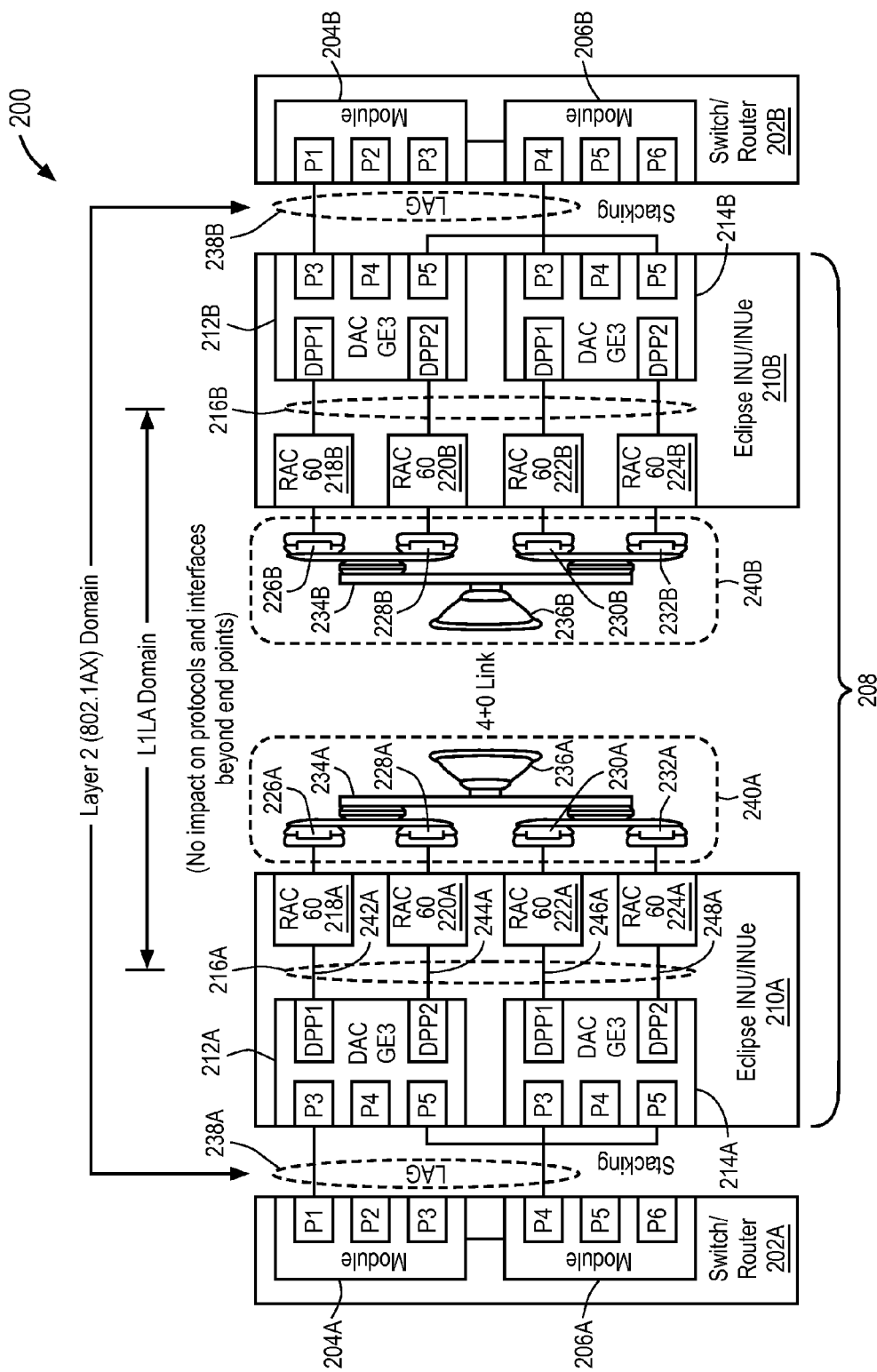
FIG. 2 illustrates a network system that incorporates a layer one link aggregation wireless channel within an IEEE 802.1AX communication channel, in some embodiments.

FIG. 2 illustrates a network system 200 that incorporates a layer one link aggregation wireless channel within an IEEE 802.1AX communication channel. Network system 200 includes a switch/router 202A (which can be a transmitter and/or a receiver) coupled via a wireless system 208 to a switch/router 202B (which can be a transmitter and/or a receiver). The switch/router 202A includes a first module 204A supporting three external ports P1-P3 and a second module 206A supporting three external ports P4-P6. The switch/router 202A implements IEEE 802.1AX link aggregation (e.g., L2LA) to transmit and/or receive data over an 802.1AX logical link 238A. Similarly, the switch/router 202B includes a first module 204B supporting three external ports P1-P3 and a second module 206B supporting three external ports P4-P6. The switch/router 202B implements IEEE 802.1AX link aggregation to transmit and/or receive data from an 802.1AX logical link 238B. The wireless system 208 transmits and receives the data between the 802.1AX logical link 238A and the 802.1AX logical link 238B.

The wireless system 208 receives the data from the 802.1AX logical link 238A or 802.1AX logical link 238B, and uses layer one link aggregation (L1LA) to communicate the data therebetween efficiently and effectively. In some embodiments, the wireless system 208 includes a first intelligent node unit 210A coupled to a first antenna assembly 240A. As shown, the first antenna assembly 240A includes four waveguide filters 226A, 228A, 230A and 232A, coupled to a waveguide 234A, and in turn coupled to a microwave antenna 236A. The wireless system 208 also includes a second intelligent node unit 210B coupled to a second antenna assembly 240B. As shown, the second antenna assembly 240B includes four waveguide filters 226B, 228B, 230B and 232B, coupled to a waveguide 234B, and in turn coupled to a microwave antenna 236B. The microwave antenna 236A of the first antenna assembly 240A and microwave antenna 236B of the second antenna assembly 240B communicate therebetween.

In some embodiments, the first intelligent node unit 210A includes a first data access card 212A having three external ports P3-P5 and two internal ports DPP1 and DPP2. The first intelligent node unit 210A also includes a second data access card 214A having three external ports P3-P5 and two internal ports DPP1 and DPP2. External port P3 of the first data access card 212A is coupled to external port P1 of the first module 204A. External port P3 of the second data access card 214A is coupled to external port P4 of the second module 206A. The four internal ports are coupled to a L1LA logical link and in turn coupled to four radio access cards (RACs) 218A, 220A, 222A and 224A. Each of 216A the radio access cards 218A, 220A, 222A and 224A are coupled to a respective one of the waveguide filters 226A, 228A, 230A and 232A of the first antenna assembly 240A. The second intelligent node unit 210B includes a first data access card 212B having three external ports P3-P5 and two internal ports DPP1 and DPP2. The second intelligent node unit 210B also includes a second data access card 214B having three external ports P3-P5 and two internal ports DPP1 and DPP2. External port P3 of the first data access card 212B is coupled to external port P1 of the first module 204B. External port P3 of the second data access card 214B is coupled to external port P4 of the second module 206B. The four internal ports are coupled to a L1LA logical link 216B and in turn coupled to four radio access cards (RACs) 218B, 220B, 222B and 224B. Each of the radio access cards 218B, 220B, 222B and 224B are coupled to a respective one of the waveguide filters 226B, 228B, 230B and 232B of the second antenna assembly 240B.

In some embodiments, when transmitting data, the first data access card 212A and second data access card 214A of the first intelligent node unit 210A (or just one of them as the master data access card) use layer one link aggregation (L1LA) to segment data from the 802.1AX logical link 238A to generate virtual containers for transport over the L1LA logical link 216A to the first antenna system 240A. When receiving data, the first data access card 212A and second data access card 214A (or just one of them as the master data access card) use layer one link aggregation (L1LA) to re-assemble the virtual containers received from the second antenna assembly 240B to generate data for transport to the 802.1AX logical link 238A. Similarly, when transmitting data, the first data access card 212B and second data access card 214B of the second intelligent node unit 210B (or just one of them as the master data access card) use layer one link aggregation (L1LA) to segment data from the 802.1AX logical link 238B to generate virtual containers for transport over the L1LA logical link 216B to the second antenna system 240B. When receiving data, the first data access card 212B and second data access card 214B (or just one of them as the master data access card) use layer one link aggregation (L1LA) to re-assemble virtual containers received from the first antenna assembly 240A to generate data for transport to the 802.1AX logical link 238B.

In some embodiments, the first data access card 212A and second data access card 214A of the first intelligent node unit 210A (or just one of them as the master data access card) use layer one link aggregation (L1LA) to segment the data from the 802.1AX logical link 238A to generate variable-length virtual containers for transport over each of the four wireless links 242A, 244A, 246A and 248A of the L1LA logical link 216A. The first data access card 212A and second data access card 214A of the first intelligent node unit 210A (or just one of them as the master data access card) determine the physical capacity of each wireless link 242A, 244A, 246A and 248A at a given time, periodically, per a given schedule, automatically, continuously, etc. Upon determining the radio capacity of the each wireless link 242A, 244A, 246A and 248A, the first data access card 212A and second data access card 214A of the first intelligent node unit 210A (or just one of them as the master data access card) selects a length of the virtual container per wireless link 242A, 244A, 246A and 248A. Adaptive modulation will trigger immediate adjustments of virtual container size and distribution. Additional details of the variable-length virtual containers are described herein.

The first data access card 212A and second data access card 214A of the first intelligent node unit 210A (or just one of them as the master data access card) distribute the virtual containers to the wireless links 242A, 244A, 246A and 248A for transport. Similarly, the first data access card 212B and second data access card 214B of the first intelligent node unit 210B (or just one of them as the master data access card) distribute the virtual containers to the wireless links 242B, 244B, 246B and 248B for transport.

Figure 3:
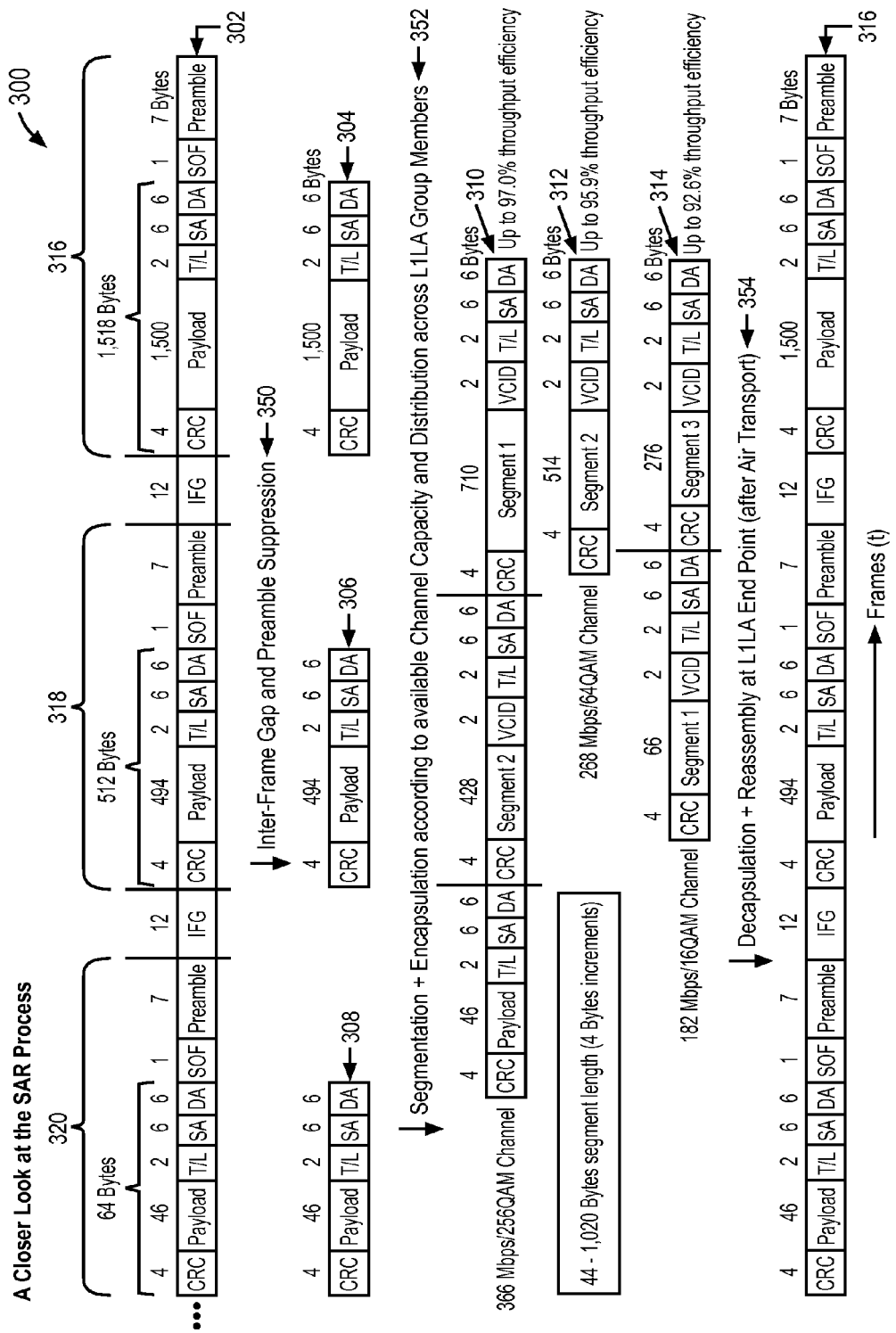
FIG. 3 shows a method of segmentation and reassembly of frames, in some embodiments.

FIG. 3 shows a method 300 of segmentation and reassembly of frames. Method 300 begins with a transmitting data access card receiving one or more Ethernet frames 302 from a router/switch. As shown, incoming Ethernet frames 302 include a first Ethernet frame 316, a second Ethernet frame 318 and a third Ethernet frame 320, each separated by an interframe gap IFG. The first Ethernet frame 316 includes a 1500 byte payload. The second Ethernet frame 318 includes a 494 byte payload. The third Ethernet frame 320 includes a 46 byte payload. Each of the frames also includes a preamble field, start of frame (SOF) field, destination address (DA) field, source address (SA) filed, type/length (T/L) field, and a cyclic redundancy check (CRC) filed.

The transmitting data access card in step 350 suppresses the interframe gap (IFG), the preamble and the start of frame (SOF), thereby generating a raw Ethernet frame 304 from Ethernet frame 316, a raw Ethernet frame 306 from Ethernet frame 318, and a raw Ethernet frame 308 from Ethernet frame 320.

The transmitting data access card in step 352 uses layer one link aggregation (L1LA) to segment each raw Ethernet frames 304, 306 and 308 (or alternatively a group of buffered one or more raw Ethernet frames 304, 306, 308). The transmitting data access card adds local encapsulation overhead to each of the segments for supporting transportation of the encapsulated raw Ethernet frame segments (as "encapsulated virtual containers") across the available wireless links 310, 312 and 314. In the example shown, available wireless link 310 supports 366 Mbps with 256 QAM, available wireless link 312 supports 268 Mbps and 64 QAM, and available wireless link 314 supports 182 Mbps and 16 QAM. In this example, available wireless link 310 has the greatest capacity, available wireless link 312 has intermediate capacity, and available wireless link 314 has the lowest capacity. The transmitting data access card segments and encapsulates the raw Ethernet frames 304, 306 and 308 according to the wireless link capacities for transport across the wireless links 310, 312 and 314.

To support proper re-assembly, the transmitting data access card adds a virtual container ID (VCID) to each of the virtual containers, or alternatively to each of the containers that include less than all of a payload. As shown, the transmitting data access card tasks the first wireless link 310 (the link with the largest capacity) to send a virtual container stream including a first virtual container that contains a first segment (including 710 bytes of the payload) of the first raw Ethernet frame 304, a second virtual container that contains a second segment (including 428 bytes of the payload) of the second raw Ethernet frame 306, and a third virtual container that contains the entire third raw Ethernet frame 308 (including 46 bytes of the payload). It will be appreciated that in the illustrated embodiment the third virtual container does not include a VCID, since the third virtual container includes the entire third raw Ethernet frame 308. The transmitting data access card tasks the second wireless link 312 to send a virtual container stream including a first virtual container that contains a second segment (including 514 bytes of the payload) of the first raw Ethernet frame 304. The transmitting data access card tasks the third wireless link 314 to send a virtual container stream including a first virtual container that contains a third segment (including 276 bytes of the payload) of the first raw Ethernet frame 304, and a second virtual container that contains a first segment (including 66 bytes of the payload) of the second raw Ethernet frame 306. As stated above, the transmitting data access card segments the raw Ethernet frames 304, 306 and 308 based on the wireless link capacities, encapsulates the raw Ethernet frame segments 304, 306 and 308, and distributes the encapsulated raw Ethernet frames 310, 312 and 314 for transport across the wireless links 310, 312 and 314.

Upon receipt of the virtual containers from the wireless links 310, 312 and 314, a receiving data access card in step 354 applies layer one link aggregation (L1LA) to decapsulate the virtual containers 310, 312 and 314, reassemble the extracted raw Ethernet frames 304, 306 and 308, and re-insert the SOF, preamble and IFG fields to generate Ethernet frames 316 (which should be the same as Ethernet frames 302). In other words, the receiving data access card regenerates the original Ethernet frames 302. As stated above, the receiving data access card uses the VCIDs to order the virtual containers properly.

Figure 4:
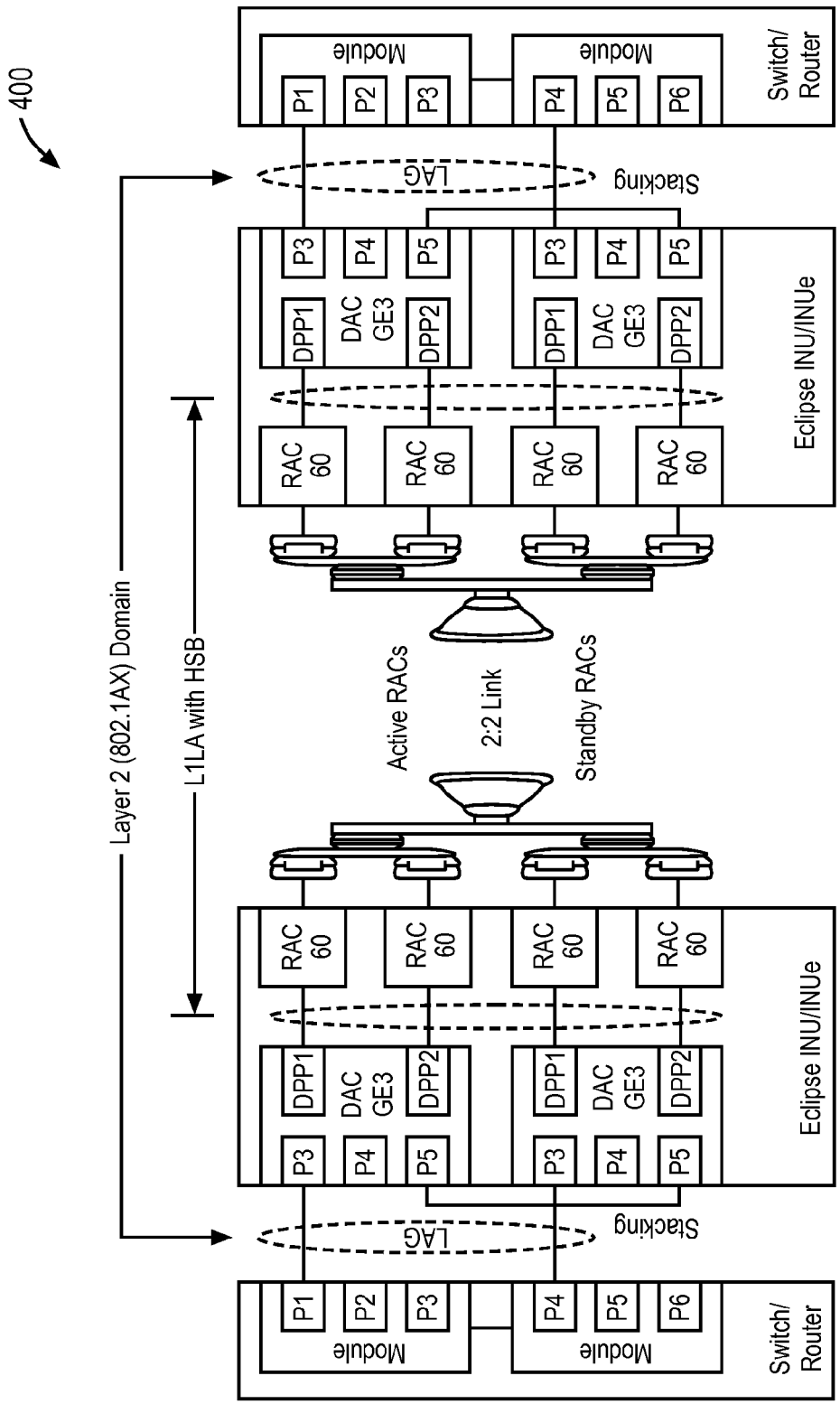
FIG. 4 shows a network system that incorporates layer one link aggregation with hot standby (HSB) redundancy, in some embodiments.

FIG. 4 shows a network system 400 (which is almost identical to network system 200) that incorporates layer one link aggregation with hot standby (HSB) redundancy. The network system 400 uses two wireless links as active links and two wireless links as standby links.

Figure 5:
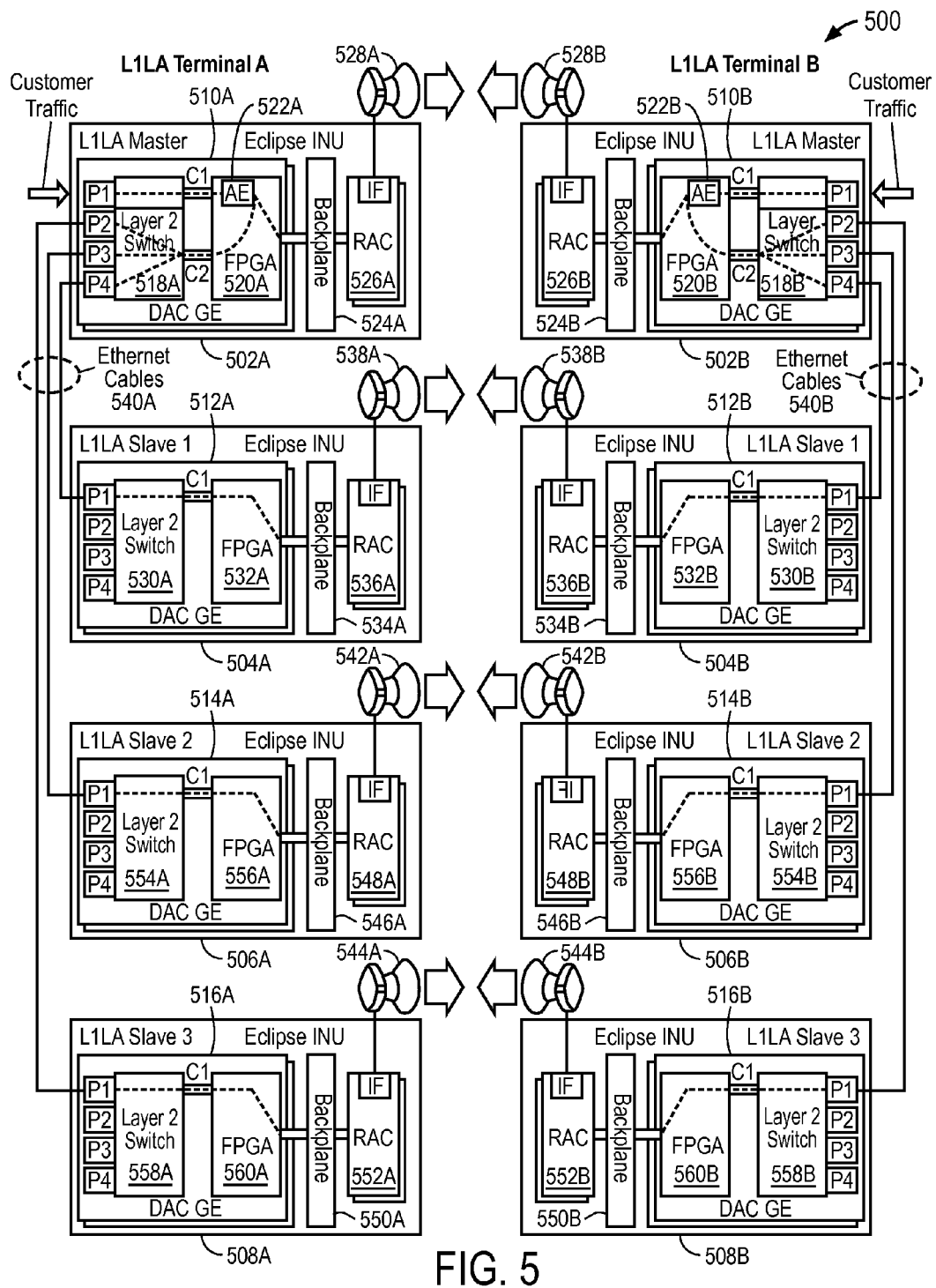
FIG. 5 shows a network system that incorporates layer one link aggregation over Ethernet (L1LAoE) using intelligent node unit (INU) slaves, in some embodiments.

FIG. 5 shows a network system 500 that incorporates layer one link aggregation over Ethernet (L1LAoE) using intelligent node unit (INU) slaves. To effect L1LAoE, the L1LAoE network system 500 internally encapsulates virtual containers into standard Ethernet frames and uses standard Ethernet cables to communicate the standard Ethernet frames between link aggregation members.

In some embodiments, the layer 1 link aggregation technique includes one L1LA master and one or more (e.g., three) L1LA slaves. The L1LA master is responsible in the transmit direction for the segmentation of the original Ethernet frames into multiple virtual containers (one per wireless link), encapsulation of the virtual containers into valid Ethernet frames (including the necessary VC de-skewing and frame alignment control information), and the physical distribution of the Ethernet-encapsulated virtual containers to corresponding L1LA slaves.

In some embodiments, each L1LA slave is responsible in the transmit direction for receiving a local Ethernet-encapsulated virtual container from the L1LA master, removing the local Ethernet encapsulation, multiplexing the virtual container into the wireless link air frame, and transmitting the wireless link air frame over its associated wireless link.

In some embodiments, each L1LA slave is responsible in the receive direction for receiving the wireless link air frame from the wireless link, extracting (demultiplexing) the virtual container from the wireless link air frame, encapsulating the virtual container into a valid Ethernet frame, and transmitting the Ethernet-encapsulated virtual container over the Ethernet port to the L1LA master.

The L1LA master is responsible in the receive direction for receiving each Ethernet-encapsulated virtual container from each L1LA slave, removing the local Ethernet encapsulation to obtain the one or more virtual containers, de-skewing and frame alignment control, and reassembling the one or more virtual containers into the original Ethernet frames.

As shown, the L1LAoE network system 500 includes a first L1LA master 502A coupled to a first antenna assembly 528A and includes a second L1LA master 502B coupled to a second antenna assembly 528B. The first antenna assembly 528A communicates with the second antenna assembly 528B. The L1LAoE network system 500 also includes three L1LA slaves 504A, 506A and 508A coupled via Ethernet cables 540A to the L1LA master 502A. Each of the L1LA slaves 504A, 506A and 508A is coupled to a respective antenna assembly 538A, 542A and 544A. The L1LAoE network system 500 also includes three L1LA slaves 504B, 506B and 508B coupled via Ethernet cables 540B to the L1LA master 502B. Each of the L1LA slaves 504B, 506B and 508B is coupled to a respective antenna assembly 538B, 542B and 544B. The antenna assembly 538A communicates with the antenna assembly 538B. The antenna assembly 542A communicates with the antenna assembly 542B. The antenna assembly 544A communicates with the antenna assembly 544B. Each of the first L1LA master 502A, the second L1LA master 502B, the L1LA slaves 504A, 506A and 508A and the L1LA slaves 504B, 506B and 508B may be formed from an Eclipse Intelligent Node Unit (INU) of Aviat Networks. It will be appreciated that the L1LA master 502A, three L1LA slaves 504A, 506A and 508A, and corresponding antenna assemblies 528A, 538A, 542A and 544A form a L1LA terminal A. It will be appreciated that the L1LA master 502B, three L1LA slaves 504B, 506B and 508B, and corresponding antenna assemblies 528B, 538B, 542B and 544B form a L1LA terminal B.

Generally, the first L1LA master 502A receives Ethernet frames (labeled as "customer data") from customer equipment, and uses layer one link aggregation to segment the incoming Ethernet frames into virtual containers for transport to the first antenna assembly 528A and to each of the L1LA slaves 504A, 506A and 508A. The first L1LA master 502A uses Ethernet-standard procedures to add local Ethernet encapsulation to the virtual containers, thereby generating Ethernet-encapsulated virtual containers, and distributes the Ethernet-encapsulated virtual containers for transport over the L1LA slaves 504A, 506A and 508A. Similarly, the second L1LA master 502B receives Ethernet frames (also labeled as "customer data") from customer equipment, and uses layer one link aggregation to segment the incoming Ethernet frames into virtual containers for transport over the second antenna assembly 528B and over each of the L1LA slaves 504B, 506B and 508B. The second L1LA master 502B uses Ethernet-standard procedures to add local Ethernet encapsulation to the virtual containers, thereby generating Ethernet-encapsulated virtual containers, and distributes the Ethernet-encapsulated virtual containers for transport over the L1LA slaves 504B, 506B and 508B.

As shown, the first L1LA master 502A includes a gigabit Ethernet data access card DAC GE 510A coupled via a backplane 524A to a RAC 526A, which is coupled to the first antenna assembly 528A. The DAC GE 510A includes four external ports P1-P4 coupled via a layer two switch 518A and two internal channels C1 and C2 to an FPGA 520A, which is coupled to the backplane 524A. The FPGA 520A includes an aggregation engine (AE) 522A. Although shown as an FPGA, one skilled in the art will recognize that an ASIC, CPLD or other processing engine could alternatively or additionally be used. The external port P1 of the first L1LA master 502A is coupled to receive Ethernet frames from the customer equipment. The external ports P2-P4 of the first L1LA master 502A are each coupled via a respective Ethernet cable 540A to a respective one of the L1LA slaves 504A, 506A and 508A. The external ports P2-P4 are now being used as internal ports. Similarly, the second L1LA master 502B includes a gigabit Ethernet data access card DAC GE 510B coupled via a backplane 524B to a RAC 526B, which is coupled to the first antenna assembly 528B. The DAC GE 510B includes four external ports P1-P4 coupled via a layer two switch 518B and two internal channels C1 and C2 to an FPGA 520B, which is coupled to the backplane 524B. The FPGA 520B includes an aggregation engine (AE) 522B. Although shown as an FPGA, one skilled in the art will recognize that an ASIC, CPLD or other processing engine could alternatively or additionally be used. The external port P1 of the second L1LA master 502B is coupled to receive Ethernet frames from the customer equipment. The external ports P2-P4 of the second L1LA master 502B are each coupled via a respective Ethernet cable 540B to a respective one of the L1LA slaves 504BA, 506B and 508B. The external ports P2-P4 are now being used as internal ports.

The layer 2 switch may be separated logically (like two VLANs) into two portions, namely, into a customer-facing switch circuit and a L1LA internal interface switch circuit. The customer-facing switch circuit (in this example between P1 and C1) provides normal layer 2 switch functions such as VLAN tagging, QoS, flow control, RWPR (resilient wireless packet ring), etc. The L1LA internal interface switch circuit is connected internally to the L1LA slave devices.

External port P1 of the first L1LA master 502A receives the Ethernet frames. The layer two switch 518A forwards the Ethernet frames over the first channel C1 to the aggregation engine 522A, which applies layer one link aggregation to segment the incoming Ethernet frames into virtual containers for transport to the first antenna assembly 528A and to each of the slaves 504A, 506A and 508A. More specifically, the aggregation engine 522A segments the incoming Ethernet frames into one or more first virtual containers for transport over the antenna assembly 528A (the size of each virtual container or the size of a set of virtual containers being based on the link capacity between the first antenna assembly 528A and the second antenna assembly 528B), one or more second virtual containers for transport over the first L1LA slave 504A (the size of each virtual container or the size of a set of virtual containers being based on the link capacity between the antenna assembly 538A and the antenna assembly 538B), one or more third virtual containers for transport over the second L1LA slave 506A (the size of each virtual container or the size of a set of virtual containers being based on the link capacity between the antenna assembly 542A and the antenna assembly 542B), and one or more fourth virtual containers for transport over the third L1LA slave 508A (the size of each virtual container or the size of a set of virtual containers being based on the link capacity between the antenna assembly 544A and the antenna assembly 544B). Similarly, external port P1 of the first L1LA master 502B receives the Ethernet frames. The layer two switch 518B forwards the Ethernet frames over the first channel C1 to the aggregation engine 522B, which applies layer one link aggregation to segment the incoming Ethernet frames into virtual containers for transport to the first antenna assembly 528B and to each of the slaves 504B, 506B and 508B. More specifically, the aggregation engine 522B segments the incoming Ethernet frames into one or more first virtual containers for transport over the antenna assembly 528B (the size of each virtual container or the size of a set of virtual containers being based on the link capacity between the first antenna assembly 528B and the second antenna assembly 528A), one or more second virtual containers for transport over the first L1LA slave 504B (the size of each virtual container or the size of a set of virtual containers being based on the link capacity between the antenna assembly 538B and the antenna assembly 538A), one or more third virtual containers for transport over the second L1LA slave 506B (the size of each virtual container or the size of a set of virtual containers being based on the link capacity between the antenna assembly 542B and the antenna assembly 542A), and one or more fourth virtual containers for transport over the third L1LA slave 508B (the size of each virtual container or the size of a set of virtual containers being based on the link capacity between the antenna assembly 544B and the antenna assembly 544A).

The aggregation engine 522A uses Ethernet-standards to add local Ethernet encapsulation to the virtual containers, thereby generating Ethernet-encapsulated virtual containers, for transport to the slaves 504A, 506A and 508A. The aggregation engine 522A distributes the one or more second Ethernet-encapsulated virtual containers via the second channel C2 over the layer two switch 518A to the external port P4 for transport over an Ethernet cable 540A to the first L1LA slave 504A. The aggregation engine 522A distributes the one or more third Ethernet-encapsulated virtual containers via the second channel C2 over the layer two switch 518A to the external port P3 for transport over an Ethernet cable 540A to the second L1LA slave 506A. The aggregation engine 522A distributes the one or more fourth Ethernet-encapsulated virtual containers via the second channel C2 over the layer two switch 518A to the external port P2 for transport over an Ethernet cable 540A to the third L1LA slave 508A. Similarly, the aggregation engine 522B uses Ethernet-standard procedures to add local Ethernet encapsulation to the virtual containers, thereby generating Ethernet-encapsulated virtual containers, for transport to the slaves 504B, 506B and 508B. The aggregation engine 522B distributes the one or more second Ethernet-encapsulated virtual containers via the second channel C2 over the layer two switch 518B to the external port P4 for transport over an Ethernet cable 540B to the first L1LA slave 504B. The aggregation engine 522B distributes the one or more third Ethernet-encapsulated virtual containers via the second channel C2 over the layer two switch 518B to the external port P3 for transport over an Ethernet cable 540B to the second L1LA slave 506B. The aggregation engine 522B distributes the one or more fourth Ethernet-encapsulated virtual containers via the second channel C2 over the layer two switch 518B to the external port P2 for transport over an Ethernet cable 540B to the third L1LA slave 508B.

The first L1LA slave 504A includes a gigabit Ethernet data access card DAC GE 512A coupled via a backplane 534A to a RAC 536A, which is coupled to the antenna assembly 538A. The DAC GE 512A includes four external ports P1-P4 coupled via a layer two switch 530A and two internal channels C1 and C2 (only C1 shown) to an FPGA 532A, which is coupled to the backplane 534A. Although shown as including an FPGA, one skilled in the art will recognize that an ASIC, CPLD or other processing engine could alternatively or additionally be used. The external port P1 of the first L1LA slave 504A is coupled to communicate the one or more second Ethernet-encapsulated virtual containers to/from the L1LA master 502A. In some embodiments, when transmitting, the FPGA 532A removes the local Ethernet encapsulation from the one or more second Ethernet-encapsulated virtual containers before transporting them to the RAC 536A. In some embodiments, when receiving, the FPGA 532A adds local Ethernet encapsulation to the virtual containers for transport to the L1LA master 502A. The external ports P2-P4 of the DAC GE 512A are currently unused. Similarly, the first L1LA slave 504B includes a gigabit Ethernet data access card DAC GE 512B coupled via a backplane 534B to a RAC 536B, which is coupled to the antenna assembly 538B. The DAC GE 512B includes four external ports P1-P4 coupled via a layer two switch 530B and two internal channels C1 and C2 (only C1 shown) to an FPGA 532B, which is coupled to the backplane 534B. Although shown as including an FPGA, one skilled in the art will recognize that an ASIC, CPLD or other processing engine could alternatively or additionally be used. The external port P1 of the first L1LA slave 504B is coupled to communicate the one or more second Ethernet-encapsulated virtual containers to/from the L1LA master 502B. In some embodiments, when transmitting, the FPGA 532B removes the local Ethernet encapsulation from the one or more second Ethernet-encapsulated virtual containers before transporting them to the RAC 536B. In some embodiments, when receiving, the FPGA 532B adds local Ethernet encapsulation to the virtual containers for transport to the L1LA master 502B. The external ports P2-P4 of the DAC GE 512B are currently unused.

The second L1LA slave 506A has similar or identical components as and operates similarly or identically to the first L1LA slave 504A. The second L1LA slave 506A includes a gigabit Ethernet data access card DAC GE 514A coupled via a backplane 546A to a RAC 548A, which is coupled to the antenna assembly 542A. The DAC GE 514A includes four external ports P1-P4. The external port P1 is coupled via a layer two switch 554A and two internal channels C1 and C2 (only C1 shown) to an FPGA 556A, which is coupled to the backplane 546A. Although shown as including an FPGA, one skilled in the art will recognize that an ASIC, CPLD or other processing engine could alternatively or additionally be used. The external port P1 of the second L1LA slave 506A is coupled to communicate the one or more third Ethernet-encapsulated virtual containers to/from the L1LA master 502A. In some embodiments, when transmitting, the FPGA 556A removes the local Ethernet encapsulation from the Ethernet-encapsulated virtual containers before transporting them to the RAC 548A. In some embodiments, when receiving, the FPGA 556A adds local Ethernet encapsulation to the virtual containers for transport to the L1LA master 502A. The external ports P2-P4 of the DAC GE 514A are currently unused. Similarly, the second L1LA slave 506B includes a gigabit Ethernet data access card DAC GE 514B coupled via a backplane 546B to a RAC 548B, which is coupled to the antenna assembly 542B. The DAC GE 514B includes four external ports P1-P4. The external port P1 is coupled via a layer two switch 554B and two internal channels C1 and C2 (only C1 shown) to an FPGA 556B, which is coupled to the backplane 546B. Although shown as including an FPGA, one skilled in the art will recognize that an ASIC, CPLD or other processing engine could alternatively or additionally be used. The external port P1 of the second L1LA slave 506B is coupled to communicate the one or more third Ethernet-encapsulated virtual containers to/from the L1LA master 502B. In some embodiments, when transmitting, the FPGA 556B removes the local Ethernet encapsulation from the Ethernet-encapsulated virtual containers before transporting them to the RAC 548B. In some embodiments, when receiving, the FPGA 556B adds local Ethernet encapsulation to the virtual containers for transport to the L1LA master 502B. The external ports P2-P4 of the DAC GE 514B are currently unused.

The third L1LA slave 508A has similar or identical components as and operates similarly or identically to the first L1LA slave 504A. The third L1LA slave 508A includes a gigabit Ethernet data access card DAC GE 516A coupled via a backplane 550A to a RAC 552A, which is coupled to the antenna assembly 544A. The DAC GE 516A includes four external ports P1-P4. The external port P1 is coupled via a layer two switch 554A and two internal channels C1 and C2 (only C1 shown) to an FPGA 560A, which is coupled to the backplane 550A. Although shown as including an FPGA, one skilled in the art will recognize that an ASIC, CPLD or other processing engine could alternatively or additionally be used. The external port P1 of the third L1LA slave 508A is coupled to communicate the one or more fourth Ethernet-encapsulated virtual containers to/from the L1LA master 502A. In some embodiments, when transmitting, the FPGA 560A removes the local Ethernet encapsulation from the Ethernet-encapsulated virtual containers before transporting them to the RAC 552A. In some embodiments, when receiving, the FPGA 560A adds local Ethernet encapsulation to the virtual containers for transport to the L1LA master 502A. The external ports P2-P4 of the DAC GE 516A are currently unused. Similarly, the third L1LA slave 508B has similar or identical components as and operates similarly or identically to the first L1LA slave 504B. The third L1LA slave 508B includes a gigabit Ethernet data access card DAC GE 516B coupled via a backplane 550B to a RAC 552B, which is coupled to the antenna assembly 544B. The DAC GE 516B includes four external ports P1-P4. The external port P1 is coupled via a layer two switch 554B and two internal channels C1 and C2 (only C1 shown) to an FPGA 560B, which is coupled to the backplane 550B. Although shown as including an FPGA, one skilled in the art will recognize that an ASIC, CPLD or other processing engine could alternatively or additionally be used. The external port P1 of the third L1LA slave 508B is coupled to communicate the one or more fourth Ethernet-encapsulated virtual containers to/from the L1LA master 502B. In some embodiments, when transmitting, the FPGA 560B removes the local Ethernet encapsulation from the Ethernet-encapsulated virtual containers before transporting them to the RAC 552B. In some embodiments, when receiving, the FPGA 560B adds local Ethernet encapsulation to the virtual containers for transport to the L1LA master 502B. The external ports P2-P4 of the DAC GE 516B are currently unused.

To avoid misconnection of devices between different groups of L1LA within same location, a group ID per L1LA master can be used. All masters and slaves of the same L1LA group use the same group ID within the location (by configuration). Periodically, the L1LA master can broadcast a "group discovery frame" into C2 to external ports P2, P3 and P4. The L1LA slaves in the group detect any group ID mismatch or Ethernet cables misconnections from the received group discovery frame. Similarly, each L1LA slave device also sends periodically a unicast "group discovery frame" to the L1LA master, authenticating its group ID. The L1LA master detects misconnected L1LA slaves of other groups, and/or detects the connection of third party devices (by timeouts).

It will be appreciated that rapid failure detection and auto-protection may be conducted on a per virtual container basis.

In some embodiments, the layer one link aggregation technique achieves near perfect load balancing among the aggregated wireless links, independent of traffic flow, payload features or patterns, making those embodiments superior to other standard (higher layer) link aggregation techniques.

Figure 6:
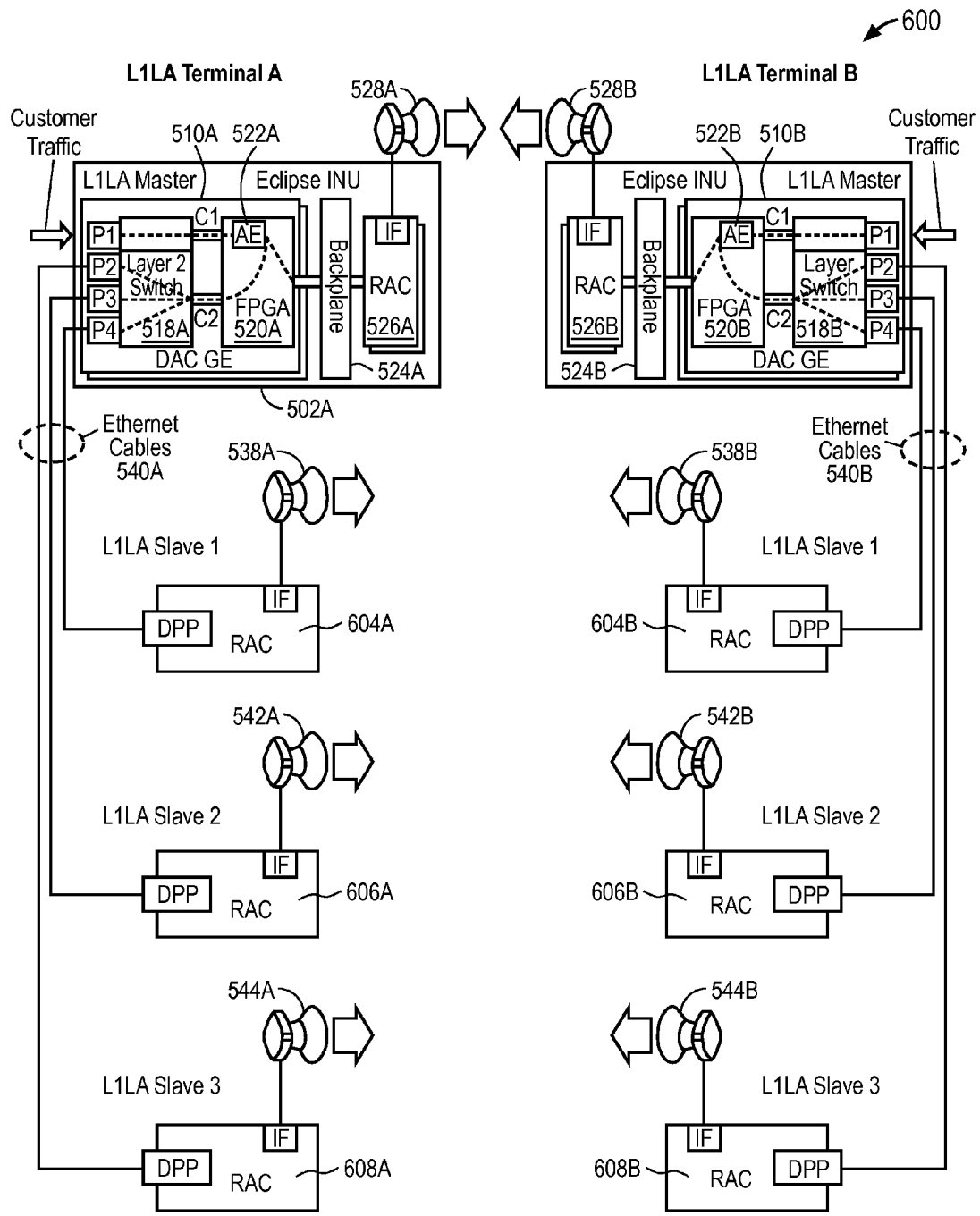
FIG. 6 shows a network system that incorporates layer one link aggregation over Ethernet (L1LAoE) using RAC L1LA slaves, in some embodiments.

FIG. 6 shows a network system 600 that incorporates layer one link aggregation over Ethernet (L1LAoE) using RAC L1LA slaves.

As shown, the L1LAoE network system 600 includes a first L1LA master 502A coupled to a first antenna assembly 528A and includes a second L1LA master 502B coupled to a second antenna assembly 528B. The first antenna assembly 528A communicates with the second antenna assembly 528B. The L1LAoE network system 600 also includes three RAC L1LA slaves 604A, 606A and 608A coupled via Ethernet cables 540A to the L1LA master 502A. Each of the RAC L1LA slaves 604A, 606A and 608A is coupled to a respective antenna assembly 538A, 542A and 544A. The L1LAoE network system 600 also includes three RAC L1LA slaves 604B, 606B and 608B coupled via Ethernet cables 540B to the L1LA master 502B. Each of the RAC L1LA slaves 604B, 606B and 608B is coupled to a respective antenna assembly 538B, 542B and 544B. The antenna assembly 538A communicates with the antenna assembly 538B. The antenna assembly 542A communicates with the antenna assembly 542B. The antenna assembly 544A communicates with the antenna assembly 544B. Each of the first L1LA master 502A and the second L1LA master 502B may be formed from an Eclipse Intelligent Node Unit (INU) of Aviat Networks. Each of the RAC L1LA slaves 604A, 606A and 608A and the RAC L1LA slaves 604B, 606B and 608B may be formed from a RAC DPP. It will be appreciated that the L1LA master 502A, three RAC L1LA slaves 604A, 606A and 608A, and corresponding antenna assemblies 528A, 538A, 542A and 544A form a L1LA terminal A. It will be appreciated that the L1LA master 502B, three RAC L1LA slaves 604B, 606B and 608B, and corresponding antenna assemblies 528B, 538B, 542B and 544B form a L1LA terminal B.

Generally, the first L1LA master 502A receives Ethernet frames (labeled as "customer data") from customer equipment, and uses layer one link aggregation to segment the incoming Ethernet frames into virtual containers for transport to the first antenna assembly 528A and to each of the RAC L1LA slaves 604A, 606A and 608A. The first L1LA master 502A uses Ethernet-standards to add local Ethernet encapsulation to the virtual containers, thereby generating Ethernet-based virtual containers, and distributes the Ethernet-based virtual containers for transport over the RAC L1LA slaves 604A, 606A and 608A. Similarly, the second L1LA master 502B receives Ethernet frames (also labeled as "customer data") from customer equipment, and uses layer one link aggregation to segment the incoming Ethernet frames into virtual containers for transport over the second antenna assembly 528B and over each of the RAC L1LA slaves 604B, 606B and 608B. The second L1LA master 502B uses Ethernet-standards to add local Ethernet encapsulation to the virtual containers, thereby generating Ethernet-encapsulated virtual containers, and distributes the Ethernet-based virtual containers to the RAC L1LA slaves 604B, 606B and 608B.

In some embodiments, in the transmit direction, each RAC L1LA slave receives the Ethernet-encapsulated virtual container from the L1LA master, removes the local Ethernet encapsulation, and forwards the virtual container to the antenna assembly. In some embodiments, in the receive direction, each RAC L1LA slave receives the virtual container, adds local Ethernet encapsulation, and forwards the Ethernet-encapsulated virtual container to the L1LA master.

Because the RAC L1LA slaves 604A, 606A, 608A, 604B, 606B and 608B are formed from a RAC DPP, the RAC L1LA slaves in some embodiments are not be limited by the backplane capacity of the INU, of which many similar products in the market suffer.

Figure 7:
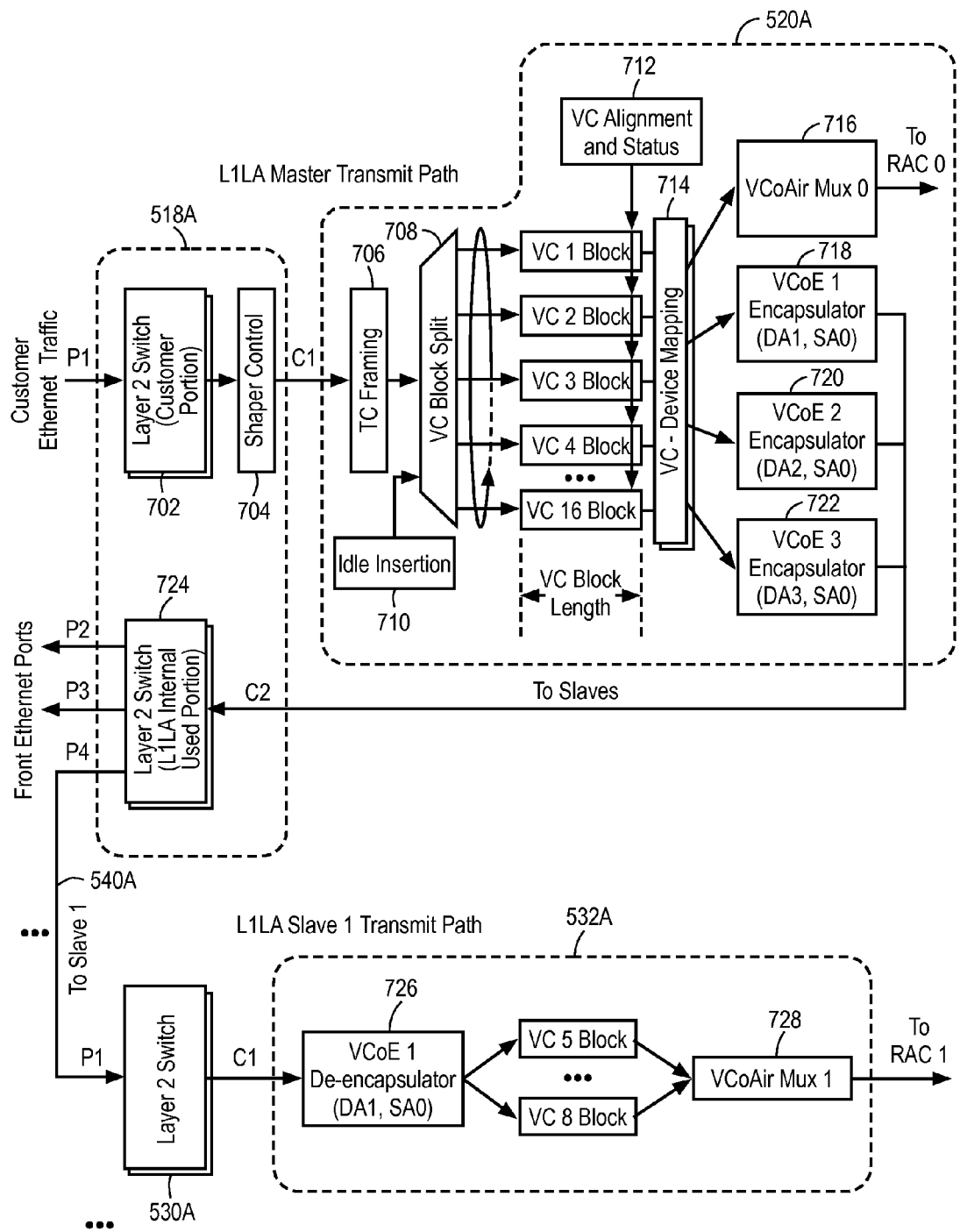
FIG. 7 is a flow diagram illustrating a L1LA transmit process, where the L1LA terminal A of FIG. 5 is the transmitter and the L1LA terminal B of FIG. 5 is the receiver, in some embodiments.

FIG. 7 is a flow diagram illustrating a L1LA transmit process, in an embodiment where the L1LA terminal A of FIG. 5 is the transmitter and the L1LA terminal B of FIG. 5 is the receiver.

Generally, a customer-facing circuit 702 of the layer 2 switch 518A of the L1LA master 502A receives customer Ethernet traffic at external port P1. The customer-facing circuit 702 forwards the customer traffic to a shaper portion 704 that performs rate limiting for channel C1. The rate is configurable with the layer 2 switch and controlled by software, depending on the current available capacity of L1LA. Any change of capacity causes the software to re-shape the rate limiter. In some embodiments, the L1LA FPGA 520A reports automatically the current virtual container status and link capacity. When a wireless link is down, the FPGA 520A automatically excludes the virtual containers associated with the failed wireless link. After the failed wireless link recovers, the FPGA 520A restores the corresponding virtual containers and the shaper expands automatically.

The layer 2 switch 518A forwards the shaped customer traffic (TC frame data) over channel C1 (an RGMII interface) to a framing circuit 706 of the FPGA 520A. The framing circuit 706 processes and frames the shaped Ethernet traffic from C1 to support transportation of the Ethernet frames across the wireless links efficiently and keep the integrity of customer Ethernet frames. A variety of different possible services performed by the framing circuit 706 follows:

In some embodiments, the framing circuit 706 on the transmit side performs preamble pruning. In a standard IEEE 802.3 Ethernet interface, there is a minimum inter-frame gap (12 bytes of idle time) and Ethernet preamble (8 bytes long sequence to indicate start of Ethernet frame (10101010 . . . 10101011). The framing circuit 706 removes the inter-frame gap and/or the preamble. Thus, more useful customer Ethernet data is transported into the wireless link. Preamble pruning may save up to 10% of bandwidth, particularly for short frame traffic (for example, 64 or 128 bytes). The IFG and preamble can be re-inserted by the receiver when delivering the TC frame data to C1 of far-end switch.

In some embodiments, the framing circuit 706 performs scrambling. Due to byte substitution of some special control characters (1 byte data substituted to 2 bytes, or 2 bytes data substituted to 3 bytes), the customer Ethernet traffic can be scrambled to reduce overhead, particularly for cases such as repeated data patterns which match proprietary special control characters. In some embodiments, the scrambler is a frame synchronized additive scrambler (byte-wise process) with generator polynomial as:

$$G(x)=x^{23}+x^{21}+x^{17}+x^{13}+1.$$

There is a corresponding descrambler on the receive side to recover original customer data.

In some embodiments, the framing circuit 706 performs byte substitution. To keep the TC frame boundary and add internal signalling, some special control characters are used. Byte substitution, similar to byte stuffing, replaces the data bytes matched with the predefined special control character when they appear in the data stream, to avoid confusion with true control signature. At the receiving end, the inverse substitution is performed.

For example, the following substitutions may take place on the incoming data stream in this order: Every occurrence of the sequence "JL" is replaced by the sequence "JLM". Every occurrence of the sequence "JK" is replaced by the sequence "ML". Every occurrence of a "C" byte is replaced by the sequence "JK". In this way, useful control signature or sequences are defined for TC framing and signaling using: C followed by anything or JLx where x is anything other than L or M. In some embodiments, the following signature or control sequences are used: JLP: start of TC frame (SOF). JLI: end of TC frame (EOF). JLBD: VC alignment sequence, where D contains VC identifier and status.

In some embodiments, the framing circuit 706 performs TC data framing. After preamble pruning, scrambling and byte substitution, the framing portion 706 packs the obtained TC data stream into a TC frame by a SOF (Start-of-Frame) and EOF (End-of-Frame).

After TC data framing, a splitter circuit 708 of the FPGA 520A splits the customer data frames into a set of virtual containers. To simplify the description, this embodiment assumes that all virtual containers have same capacity (data rate). Unequal VC capacity and unequal VC block length are discussed in further sections.

The splitter circuit 708 segments the incoming TC frame into up to sixteen different VC blocks (VC 1 block to VC 16 block) of fixed block length. Considering the support of adaptive modulation for a radio carrier (four modulations: QPSK, 16QAM, 64QAM, and 256QAM), the maximum number of virtual channels in L1LA is sixteen (4 modulations×4 carriers or devices). A L1LA system can use any number of the sixteen VCs, depending on the need. The VCs configured for use are called "valid" VCs. The splitter circuit 708 distributes the segmented data (VC blocks) one-by-one into all valid VC block buffers, e.g., in a round-robin fashion. At the end of the frame, an idle insertion circuit 710 of the FPGA 520A may in some embodiments add idle bytes into a final VC block.

VC block length may be selected considering two facts, namely, delay on buffering a VC block length data, and overhead on VCoE, particularly due to throughput restriction of C2. In some embodiments, the FPGA 520A uses a default 256 bytes of VC block length. The effective VC block data throughput over C2 is about 860 Mbps:

$$VC\_Block\_Length / (IFG + Preamble + VCoE\_Overhead + VC\_Block\_Length) = 256/(12 + 8 + 20 + 256) = 86\%$$

This effective throughput over C2 is sufficient to support gigabit L1LA because only ¾ of the TC data stream will go through C2 (slave streams).

Figure 9:
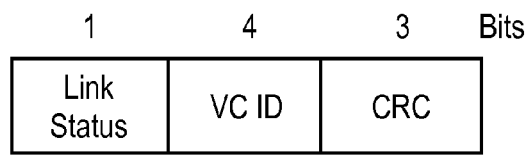
FIG. 9 shows a D byte, in some embodiments.

A VC alignment and status circuit 712 of the FPGA 520A performs VC alignment and status functions. Due to different latencies on each wireless link, the VC alignment and status circuit 712 inserts a VC alignment sequence (JLBD) once every 500 uS into all valid VC streams. The alignment sequences are used not only for VC FIFO de-skew at the receiving side, but also for rapid failure detection of a virtual container. FIG. 9 shows the so called D byte, which has a link status, a VC ID and CRC protection.

The VC alignment and status circuit 712 declares a VC is UP on one side, when the VC alignment and status circuit 712 detects a certain consecutive number of JLBD on that VC with the reported far-end VC status being UP. The VC alignment and status circuit 712 declares a VC is DOWN on one side, when the VC alignment and status circuit 712 detects a timeout (a certain consecutive period of 500 uS) from receiving JLBD on that VC, or if the far-end reported VC status is DOWN. Note that any unidirectional failure will cause the VC status to go DOWN on both ends. Detecting a VC failure quickly is called "Rapid Failure Detection (RFD)." The VC alignment and status circuit automatically excludes bad VCs and restores them once they recover. The VC alignment and status circuit 712 is able to detect and report quickly a change of VC status to embedded software for a faster rate adjustment of the shaper 704 (to avoid overflow on the FPGA buffer).

A VC device mapping circuit 714 maps the VC blocks to each of the wireless links. The VC device mapping circuit 714 maps VC blocks to a VCoAir multiplexer 716, a VC0E 1 encapsulator 718 (for the first slave 504A), a VCoE 2 encapsulator 720 (for the second slave 506A), and a VCoE 3 encapsulator 722 (for the third slave 508A). The VCoAir multiplexer 716 transmits its received VC blocks to its RAC 526A for generation of one or more wireless link frames (VCoAir frames) for transport over the first antenna assembly 528A.

The VCoE 1 encapsulator 718 encapsulates its received VC blocks into one or more first Ethernet-encapsulated virtual containers (VCoE 1) for transport to the first slave 504A. The VCoE 2 encapsulator 720 encapsulates its received VC blocks into one or more second Ethernet-encapsulated virtual containers (VCoE 2) for the second slave 506A. The VCoE 3 encapsulator 722 encapsulates its received VC blocks into one or more third Ethernet-encapsulated virtual containers (VCoE 3) for the third slave 508A.

Figure 10:
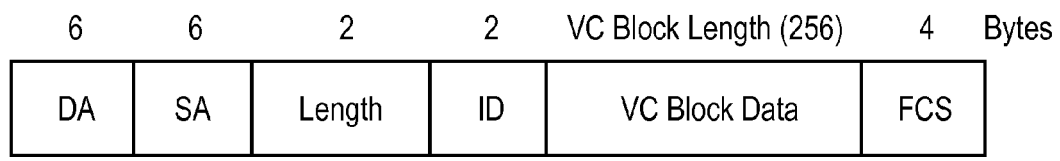
FIG. 10 shows a L1LA VCoE frame structure, in some embodiments.

FIG. 10 shows a L1LA VCoE frame structure, which includes standard Ethernet frame fields including destination MAC address (DA) of the VCoE (master, slave 1, slave 2 or slave 3), source MAC address (SA) of the VCoE (master, slave 1, slave 2 or slave 3), payload length (Length) (ID+ VC_block_length), VC headers of VC block data or VC ID (ID), corresponding VC data in fixed length (VC Block Data), and standard frame check sequence or CRC32 (FCS). To uniquely identify devices, MAC addresses can be reserved for local use between L1LA devices: 00:10:6A:04:9 E:00 (Master), 00:10:6A:04:9 E:01 (Slave 1), 00:10:6A:04:9 E:02 (Slave 2), and 00:10:6A:04:9 E:03 (Slave 3). These MAC addresses may be hard-coded in the FPGA 520A and selected accordingly. These MAC addresses are valid locally. The MAC header will not be sent into the air.

The VCoE 1 encapsulator 718, VCoE 2 encapsulator 720 and VCoE 3 encapsulator 722 communicate the VCoE 1, VCoE 2 and VCoE 3 to an internal interface 724 of the layer 2 switch 518A, which forwards the Ethernet-encapsulated virtual containers over Ethernet cables 540 to each respective slave over external ports P2, P3 and P4. It will be appreciated that, in some embodiments, the internal interface 724 connects the master and slave devices for L1LA internal use only. To prevent undesirable interference between slaves, the L1LA internal interface 724 uses a special port masks such as: C2-P2, C2-P3 and C2-P4. Thus, the slave's ports P2, P3 and P4 never forward frames to each other, except to or from channel C2 of the master device 502A. MAC address learning is always enabled in the internal interface 724. Accordingly, frames are forwarded only to ports of connected devices. Unknown unicast MAC address flooding is always disabled, to avoid flooding other devices when one device is disconnected. Broadcast from master to slaves for "Group Discovery Frames" is allowable. Thus, each slave only talks with the master.

As shown in FIG. 7, external port P4 is coupled to the layer 2 switch 530A of the first slave 504A. The layer 2 switch 530 forwards the VCoE 1 across the first channel C1 to a VCoE 1 decapsulator circuit 726 of the FPGA 532A of the first slave 504A, which removes the local Ethernet encapsulation (MAC header), thereby generating VC blocks which are put into air frame FIFO buffers ready for transport. A VCoAir multiplexer circuit 728 of the FPGA 532A of the first slave 504A extracts and converts the VC blocks into RAC air-frames (TDM circuits) on per byte basis, which it sends to the RAC 536A for transport over the antenna assembly 538A. At the receiving end, there is a VCoAir demultiplexer to perform inverse mapping from RAC air-frames to virtual containers.

Figure 8:
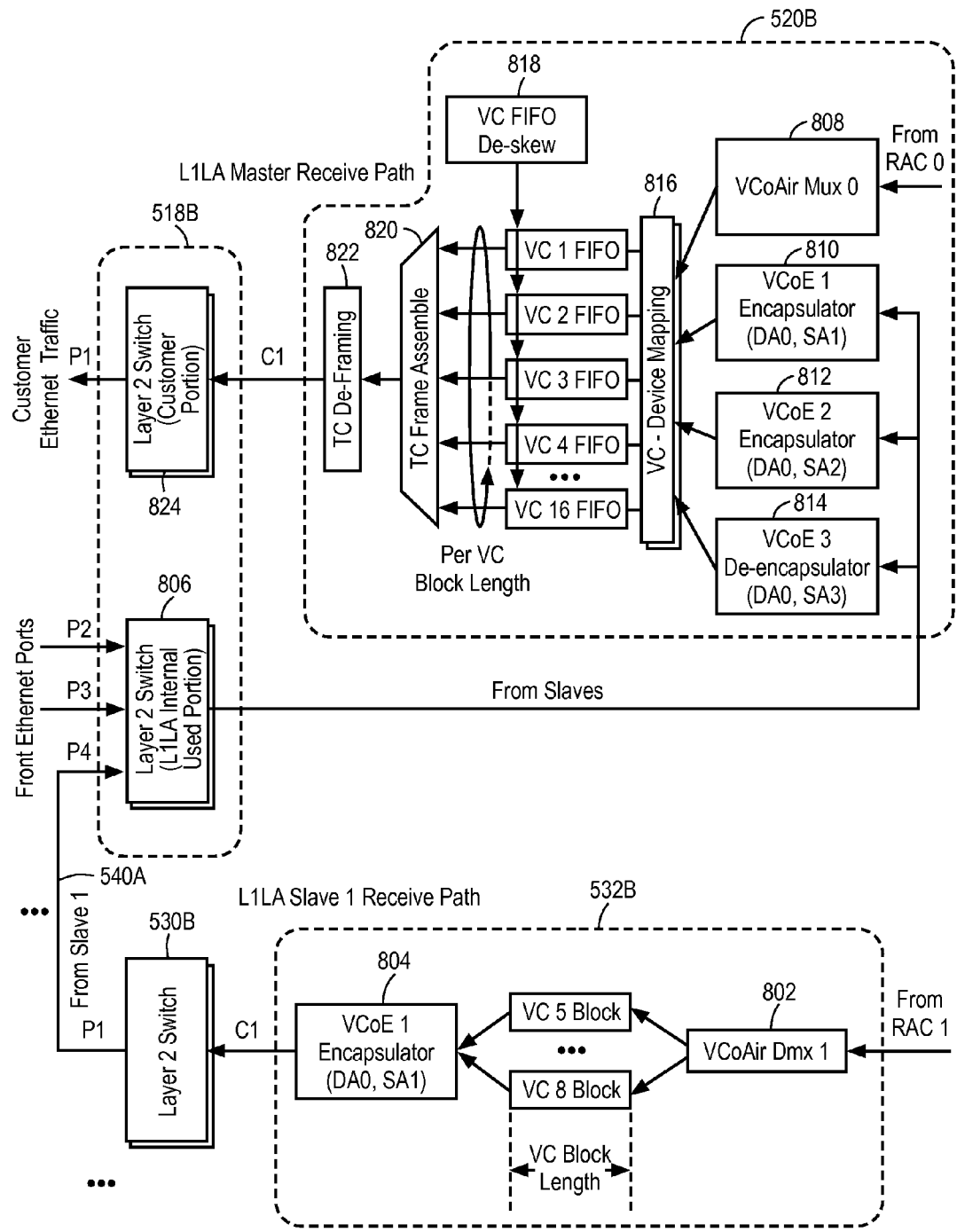
FIG. 8 is a flow diagram illustrating a L1LA receive process, where the L1LA terminal A of FIG. 5 is the transmitter and the L1LA terminal B of FIG. 5 is the receiver, in some embodiments.

FIG. 8 is a flow diagram illustrating a L1LA receive process, in an embodiment where the L1LA terminal A of FIG. 5 is the transmitter and the L1LA terminal B of FIG. 5 is the receiver.

Generally, the antenna assembly 538B of the first slave 504B receives the incoming wireless link air frame 1. A VCoAir demultiplexer 1 circuit 802 extracts the virtual container blocks, and forwards the virtual container blocks to a VCoE encapsulator circuit 804. The VCoE encapsulator circuit 804 encapsulates the virtual container blocks for transport to the L1LA master 502B. The layer 2 switch 530B of the slave 504B forwards the Ethernet-encapsulated virtual container blocks over external port P1 of the slave 504B to the internal interface 806 of the layer 2 switch 518B of the master 502B. The internal interface 806 forwards the Ethernet-encapsulated virtual container blocks to the VCoE 1 decapsulator 810 (since they are addressed to it). The VCoE 1 decapsulator 810 removes the local Ethernet encapsulation, and forwards the virtual container blocks to the VC device mapping circuit 816, which maps them to VC FIFOs (VC 1 FIFO, VC FIFO 2, . . . VC FIFO 16). A VC FIFO de-skew circuit de-skews the virtual container blocks. When performing de-skewing, the FPGA searches JLBD sequence on all virtual container FIFOs and aligns them. A TC frame reassembly circuit 820 of the FPGA 520B reassembles the virtual container blocks to generate the framed original Ethernet traffic. When assembling the blocks, the TC frame assembly circuit 820 forms the TC stream by picking one VC block (predefined fixed length) from each VC FIFO according to the original pattern (e.g., round-robin fashion). A de-framing circuit 822 removes the framing inserted at the transmit side to recreate the original Ethernet frames. When performing de-framing, the TC de-framing circuit 822 searches for the start-of-frame (JLP) and end-of-frame (JLI) and performs byte de-substitution, de-scrambling and preamble insertion. The de-framing circuit 822 re-inserts any pruned overhead and delivers the received customer traffic to the customer-facing circuit 824 of the layer 2 switch 518B of the master 502B via the first channel C1. The customer-facing circuit 824 forwards the customer traffic to the customer devices.

Although the above embodiments have been described using fixed size VC blocks, it will be appreciated that better utilization is achieved in wireless L1LA systems when using unequal block length virtual containers. For example, if virtual container capacity is 86 Mbps (42xE1), then utilization may be as follows:

| #VCs (M/S1/S2/S3) | Master (Mbps) | Slave 1 (Mbps) | Slave 2 (Mbps) | Slave 3 (Mbps) |
|---|---|---|---|---|
| 3/3/3/3 | 258 | 258 | 258 | 258 |
| 4/3/2 | 344 | 258 | 172 | — |
| 4/4/4 | 344 | 344 | 344 | — |
| 3/2/1 | 258 | 172 | 86 | — |

In many L1LA applications, link capacities vary a lot and equal virtual container block length proves less effective. In some embodiments, an unequal virtual container block length resolves this difficulty. To achieve unequal virtual container capacities, each FPGA segments the incoming TC frame into unequal virtual container block lengths, L[1], . . . , L[16] for respective virtual containers 1-16. The actual virtual container capacity will be $$VC\_Cap[i] = Total\_Cap * L[i] / \Sigma L[j], i=1, \ldots, 16;$$

where Total_Cap is the total L1LA logical link capacity (sum of all wireless link capacities), with a lower restriction that virtual container block length for each virtual container block should be at least 24 bytes (minimum Ethernet frame length is 64 bytes).

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A first layer one link aggregation master configured to control transmission of customer traffic to a receiver, the first layer one link aggregation master comprising:
    a first port coupled to receive customer traffic;
    a first channel;
    a second channel;
    an aggregation engine coupled to the first and second channels;
    a first switch circuit coupled to the first port and to the first channel, and configured to communicate the customer traffic from the first port over the first channel to the aggregation engine, the aggregation engine including a splitter circuit configured to use layer one information to segment at least a portion of the customer traffic into a first virtual container and a second virtual container, the aggregation engine further including an encapsulation circuit configured to encapsulate the second virtual container using Ethernet standards for transport over the second channel;
    a radio access card configured to generate an air frame based on the first virtual container for wireless transmission over a first wireless link of a link aggregation group to the receiver; and
    a second switch circuit coupled to the second channel, and configured to communicate the Ethernet-encapsulated second virtual container over an Ethernet cable to a slave switching circuit for wireless transmission over a second wireless link of the link aggregation group to the receiver.

2. The master of claim 1, wherein the splitter circuit segments the at least a portion of the customer traffic into the first virtual container to have a first size based on a capacity of the first wireless link and the second virtual container to have a second size based on a capacity of the second wireless link.

3. The master of claim 1, wherein the receiver is a second layer one link aggregation master.

4. The master of claim 1, wherein the aggregation engine includes a field-programmable gate array (FPGA).

5. The master of claim 1, wherein the first and second switch circuits are layer two switch circuits.

6. A first layer one link aggregation master configured to control transmission of customer traffic to a receiver, the first layer one link aggregation master comprising:
    means for receiving customer traffic;
    means for communicating the customer traffic over a first channel;
    means for receiving the customer traffic from the first channel and using layer one information to segment at least a portion of the customer traffic into a first virtual container and a second virtual container;
    means for generating an air frame based on the first virtual container for wireless transmission over a first wireless link of a link aggregation group to a receiver;

means for encapsulating the second virtual container using Ethernet standards for transport over a second channel; and means for communicating the Ethernet-encapsulated second virtual container over an Ethernet cable to a slave switching circuit for wireless transmission over a second wireless link of the link aggregation group to the receiver.

7. A method comprising:

receiving customer traffic;

communicating the customer traffic over a first channel to an aggregation engine;

using, by the aggregation engine, layer one information to segment at least a portion of the customer traffic into a first virtual container and a second virtual container;

generating an air frame based on the first virtual container for wireless transmission over a first wireless link of a link aggregation group to a receiver;

encapsulating the second virtual container using Ethernet standards for transport over a second channel; and communicating the Ethernet-encapsulated second virtual container over an Ethernet cable to a slave switching circuit for wireless transmission over a second wireless link of the link aggregation group to the receiver.

8. A first layer one link aggregation master configured to control transmission of customer traffic to a customer device, comprising:

a radio access card configured to receive an air frame based on a first virtual container from a first wireless link of a link aggregation group;

an internal interface switch circuit configured to receive an Ethernet-encapsulated second virtual container from a slave switching circuit, the slave switching circuit having received a second air frame based on the second virtual container from a second wireless link of the link aggregation group;

a first channel;

a second channel coupled to the internal interface switch circuit;

an aggregation engine coupled to the first channel and to the second channel, configured to receive the first virtual container from the radio access card, configured to receive the Ethernet-encapsulated second virtual container from the internal interface switch circuit via the second channel, configured to decapsulate the Ethernet-encapsulated second virtual container to generate the second virtual container, and including an assembly circuit configured to assemble the first virtual container and the second virtual container to generate customer data; and a customer-facing switch circuit coupled to the first channel, and configured to receive the customer data from the aggregation engine via the first channel and to transmit the customer data over a first port to a customer device.

9. The master of claim 8, wherein the first virtual container has a first size based on a capacity of the first wireless link and the second virtual container has a second size based on a capacity of the second wireless link.

10. The master of claim 8, wherein the aggregation engine includes a field-programmable gate array (FPGA).

11. The master of claim 8, wherein the internal interface switch circuit and the customer-facing switch circuit are layer two switch circuits.

12. A first layer one link aggregation master configured to control transmission of customer traffic to a customer device, comprising:

means for receiving an air frame based on a first virtual container from a first wireless link of a link aggregation group;

means for receiving an Ethernet-encapsulated second virtual container from a slave switching circuit, the slave switching circuit having received a second air frame based on the second virtual container from a second wireless link of the link aggregation group;

means for decapsulating the Ethernet-encapsulated second virtual container to generate the second virtual container;

means for assembling the first virtual container and the second virtual container to generate customer data; and means for transmitting the customer data to a customer device.

13. A method comprising:

receiving an air frame based on a first virtual container from a first wireless link of a link aggregation group;

receiving an Ethernet-encapsulated second virtual container from a slave switching circuit, the slave switching circuit having received a second air frame based on the second virtual container from a second wireless link of the link aggregation group;

decapsulating the Ethernet-encapsulated second virtual container to generate the second virtual container;

assembling the first virtual container and the second virtual container to generate customer data; and transmitting the customer data to a customer device.

14. A layer one link aggregation terminal configured to transmit customer traffic to a receiving terminal, the layer one link aggregation terminal comprising:

a first antenna assembly configured to assist in establishing a first wireless link of a link aggregation group with the receiving terminal;

a second antenna assembly configured to assist in establishing a second wireless link of the link aggregation group with the receiving terminal;

an Ethernet cable;

a first layer one link aggregation master including:

a first port coupled to receive customer traffic;

a first channel;

a second channel;

an aggregation engine coupled to the first and second channels;

a first switch circuit coupled to the first port and to the first channel, and configured to communicate the customer traffic from the first port over the first channel to the aggregation engine, the aggregation engine including a splitter circuit configured to use layer one information to segment at least a portion of the customer traffic into a first virtual container and a second virtual container, the aggregation engine further including an encapsulation circuit configured to encapsulate the second virtual container using Ethernet standards for transport over the second channel;

a first radio access card configured to generate a first air frame based on the first virtual container for wireless transmission by the first antenna assembly over the first wireless link to a second terminal; and a second switch circuit coupled to the second channel and to the Ethernet cable, and configured to communicate the Ethernet-encapsulated second virtual container to the Ethernet cable; and a first slave device coupled to the Ethernet cable, and configured to receive the Ethernet-encapsulated second virtual container from the Ethernet cable, the slave device including:

a decapsulation circuit for decapsulating the Ethernet-encapsulated second virtual container; and a second radio access card coupled to the decapsulation circuit and to the second antenna assembly and configured to generate a second air frame based on the second virtual container for wireless transmission by the second antenna assembly over the second wireless link to the receiving terminal.

15. A layer one link aggregation terminal configured to transmit customer traffic to a customer device, the layer one link aggregation terminal comprising:

a master antenna assembly configured to assist in establishing a master wireless link of a link aggregation group with a transmitting terminal;

a slave antenna assembly configured to assist in establishing a slave wireless link of the link aggregation group with the transmitting terminal;

an Ethernet cable;

a first slave, including:
  a slave radio access card coupled to the slave antenna assembly and configured to receive a slave air frame based on a slave virtual container over the slave wireless link; and
  an encapsulation circuit for encapsulating the slave virtual container to generate an Ethernet-encapsulated slave virtual container;

a slave switching circuit coupled to the Ethernet cable and configured to transmit the Ethernet-encapsulated slave virtual container to the Ethernet cable; and a layer one link aggregation master including:
  a master radio access card configured to receive a master air frame based on a master virtual container from the master wireless link;
  an internal interface switch circuit configured to receive the Ethernet-encapsulated slave virtual container from the slave;
  a first channel;
  a second channel coupled to the internal interface switch circuit;
  an aggregation engine coupled to the first channel and to the second channel, configured to receive the master virtual container from the master radio access card, configured to receive the Ethernet-encapsulated slave virtual container from the internal interface switch circuit via the second channel, configured to decapsulate the Ethernet-encapsulated slave virtual container to generate the second virtual container, and including an assembly circuit configured to assemble the master virtual container and the slave virtual container to generate customer data; and a customer-facing switch circuit coupled to the first channel, and configured to receive the customer data from the aggregation engine via the first channel and to transmit the customer data over a first port to a customer device.

\* \* \* \* \*